United States Patent [19]
Li et al.

[11] Patent Number: 5,510,299
[45] Date of Patent: Apr. 23, 1996

[54] METHOD FOR THE MANUFACTURE OF IC-PROCESSED MICRO ELECTRO-STATIC MOTORS

[75] Inventors: Zhi-Jian Li; Xi-Qing Sun; Li-Tian Liu, all of Beijing, China

[73] Assignee: United Microelectronics Corp., Taiwan, China

[21] Appl. No.: 253,940

[22] Filed: Jun. 3, 1994

[51] Int. Cl.$^6$ .................................................. H01L 21/302
[52] U.S. Cl. ........................... 437/225; 437/228; 437/250; 310/40 MM
[58] Field of Search .................................... 437/225, 228, 437/250; 310/40 MM, DIG. 6

[56] References Cited

U.S. PATENT DOCUMENTS

| | | | |
|---|---|---|---|
| 5,093,594 | 3/1992 | Mehregany | 310/40 MM |
| 5,191,251 | 3/1993 | Paratte | 310/40 MM |
| 5,296,775 | 3/1994 | Cronin et al. | 310/40 MM |
| 5,327,033 | 7/1994 | Guckel et al. | 310/40 MM |
| 5,331,236 | 7/1994 | Sexton | 310/40 MM |

FOREIGN PATENT DOCUMENTS

| | | | |
|---|---|---|---|
| 9007223 | 6/1990 | WIPO | 310/40 MM |

OTHER PUBLICATIONS

Howe et al., "Silicon Micromechanics: Sensors and Actuators on a Chip," IEEE Spectrum, Jul. 1990, pp. 29–35.

Primary Examiner—Tom Thomas
Assistant Examiner—Kevin M. Picardat
Attorney, Agent, or Firm—Townsend and Townsend and Crew

[57] ABSTRACT

A method for manufacturing a micro electro-static motor which is provided with a curved bearing structure for rotatably supporting the rotor of the micro electro-static motor in a line contact manner in order to reduce the frictional torque of the micromotor. The micro electro-static motor is also provided with four on-chip rotational speed detection devices to facilitate its rotational speed measurement and the closed-loop control of the rotational speed. The on-chip rotational speed detection devices are accomplished by forming four P-N junctions in a silicon substrate. The curved bearing structure can be accomplished by etching of a phosphosilicate glass/silicon oxide composite sacrificial layer to form a curved bearing opening due to the large difference of etch rates between the phosphosilicate glass and the silicon oxide in buffered HF and by forming a curved bearing in the curved bearing opening.

13 Claims, 5 Drawing Sheets

METHOD FOR THE MANUFACTURE OF IC-PROCESSED MICRO ELECTRO-STATIC MOTORS

BACKGROUND OF THE INVENTION

The present invention relates to a method for the manufacture of an IC-processed micro electro-static motor, and more particularly to a method for manufacturing an IC-processed micro electro-static motor which is provided with a curved bearing structure to significantly decrease the frictional torque of the micro electro-static motor, and an on-chip detection device to facilitate the micromotor rotational speed detection.

Some publications, for example W. S. Trimmer and K. J. Gabriel, "Design Considerations for a Practical Electrostatic Micromotor", *Sensors and Actuators*, 11 (1987), pp. 189–206, and S. F. Bart et al., "Design Considerations for Microfabricated Electric Actuators", *Sensors and Actuators*, 14 (1988), pp. 269–292, have discussed possible designs for micromotors based on electrostatic-drive principles. In recent years, there has been a continuous development of silicon surface micromachining technology. Some micromechanical devices, such as micro-turbines and micro electro-static motors, which are not accessible by conventional machining technologies have been successfully made out by using technology derived from IC (integrated-circuit) manufacturing processes. For example, the literature, L. S. Fan et al., "IC-processed Electrostatic Micromotors", *Sensors and Actuators*, vol. 20, pp. 41–47, 1989, describes the design, fabrication and operation of several electrostatically driven rotating motors, including the stepping micromotors and the synchrohous micromotors, that have been produced by using integrated-circuit processing. The literature, M. Mehregany et al., "Measurement of Wear in Polysilicon Micromotors", *IEEE Trans. Electron Devices*, Vol. 39, No. 5, pp. 1136–1143, May 1992, describes two polysilicon variable-capacitance rotary side-drive micromotor types, including harmonic (or wobble) and salient-pole, that are produced by IC microfabrication technology.

One of the important issues in the design of micromotor structures design is how to reduce friction and surface sticking between the rotor and the bearing (or hub). It is found that the contact of the rotor and the bearing in the prior art is a surface contact or plane contact, resulting in a relatively large frictional torque for the micromotor. In addition, a relatively complicated measurement system, such as a video camera system or laser-based measurement system, is inevitably needed to detect the rotational speed of the conventional micromotor. The laser-based measurement system is detailed in K. J. Gabriel et al., "In situ Friction and Wear Measurements in Integrated Polysilicon Mechanisms", *Sensors and Actuators*, A21–A23 (1990), pp. 184–188. Thus, how to improve the method of detecting micromotor rotational speed is also an important issue in this art.

SUMMARY OF THE INVENTION

Therefore, the primary object of the present invention is to provide a method of manufacturing an IC-processed or silicon-based micro electrostatic motor with a curved bearing structure that has only in line contact with the rotor bottom by the use of silicon oxide/phosphosilicate glass ($Si_xO_y$/PSG) composite sacrificial layer technology. In this way, the friction and surface sticking between the rotor and the bearing are significantly reduced, resulting in a relatively small frictional torque of the micromotor.

Another object of the present invention is to provide a method of manufacturing an IC-processed or silicon-based micro electro-static motor which is provided with an on-chip detection device for facilitating the measurement of micromotor rotational speed.

In accordance with the present invention, a method for manufacturing a micro electro-static motor comprises the steps of:

(a) providing a silicon substrate having a first conductivity type;

(b) forming an isolation layer over the silicon substrate;

(c) forming a shield layer on a predetermined surface region of the isolation layer;

(d) depositing in sequence a layer of phosphosilicate glass and a layer of silicon oxide over the shield layer and the exposed surface of the isolation layer;

(e) patterning the layers of phosphosilicate glass and silicon oxide by lithography and etching to form a phosphosilicate glass/silicon oxide composite sacrificial layer;

(f) depositing a first structure layer over the phosphosilicate glass/silicon oxide composite sacrificial layer and the exposed surface of the isolation layer;

(g) patterning the first structure layer by lithography and etching to form a rotor and a stator of the micro electro-static motor;

(h) forming a first block-out mask over the rotor and stator regions and the nonplanned bearing region;

(i) etching the exposed phosphosilicate glass/silicon oxide composite sacrificial layer to form a curved bearing opening;

(j) removing the first block-out mask;

(k) depositing a second sacrificial layer over all of the exposed surface with a bearing anchor opening therethrough to expose a portion of the shield layer;

(l) depositing a second structure layer and defining it to form a curved bearing residing in the bearing anchor opening and the curved bearing opening; and (m) removing all of the phosphosilicate glass/silicon oxide composite sacrificial layer and the second sacrificial layer by etching to release the rotor, so that the rotor is rotatably supported by the curved bearing.

According to one aspect of the present invention, the step (c) includes the steps of patterning the isolation layer by lithography and etching to expose at least one silicon substrate surface for the formation of the planned rotational speed detection device, forming a first layer of polysilicon acting as the shield layer on the predetermined region of the isolation layer and the exposed substrate surface, heavily doping the first polysilicon layer with a dopant of a second conductivity type opposite to the first conductivity type, and annealing the first polysilicon layer, so that parts of the dopant in the first polysilicon layer diffuse into the silicon substrate to form a P-N junction acting as a rotational speed detection device.

According to another aspect of the present invention, the step (i) includes the steps of reactive ion etching of the exposed phosphosilicate glass/silicon oxide composite sacrificial layer to form a cone-like cavity, and time-limited buffered HF etching of the phosphosilicate glass/silicon oxide composite sacrificial layer to form the curved bearing opening.

According to further aspect of the present invention, the first and second structure layers are a second and third layers of polysilicon, and the second sacrificial layer is a layer of silicon oxide. The step (m) includes the step of dissolving all of the second sacrificial layer and the phosphosilicate glass/silicon oxide composite sacrificial layer in buffered HF.

BRIEF DESCRIPTION OF THE DRAWINGS

The present invention can be more fully understood by reference to the following description and accompanying drawings, which form an integral part of this application:

FIG. 3 schematically shows the three-phase driving signals supplied to the IC-processed micro electro-static motor of FIG. 2.

DETAILED DESCRIPTION OF THE PREFERRED EMBODIMENTS

Figure 1A:
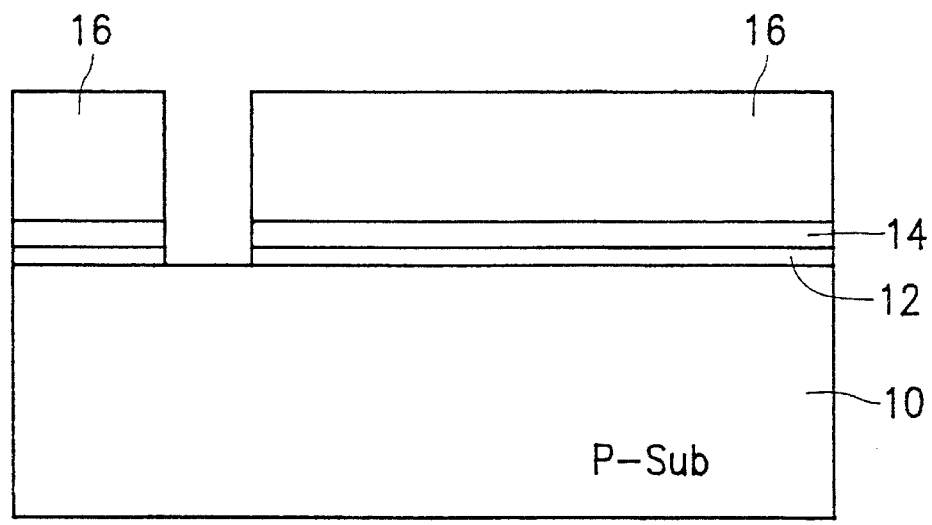
FIGS. 1(a) through 1(i) schematically show in cross section one preferred embodiment of the method for manufacturing an IC-processed micro electro-static motor according to the present invention.

Referring now to FIGS. 1(a) through 1(i), there is shown one preferred embodiment of the method for manufacturing an IC-processed or silicon-based micro electro-static motor according to the present invention. It should be noted that the dimensions of the micro electro-static motor and its elements as shown in the drawings do not intend to precisely correspond to those of the real product for the sake of conveniently sketching and illustrating.

With reference to FIG. 1(a), the surface of a semiconductor substrate 10, for example a P-type silicon substrate having a (100) crystallographic orientation, is covered with an isolation layer. In this embodiment, the isolation layer is preferably composed of a film of thermally grown silicon dioxide 12 and an overlay layer of silicon-rich nitride 14. The silicon dioxide film 12 preferably has a thickness of about 400 nanometers, and the silicon nitride layer 14, about 800 nanometers. A block-out mask 16 of resist material is formed over the silicon nitride layer 14, and leaves uncovered the planned rotational speed detection device regions. This mask 16 is made by conventional lithography and etching techniques as are known in the art. The portions of the isolation layer which are uncovered by the mask 16 are removed by etching, and then the mask 16 is removed.

Figure 1B:
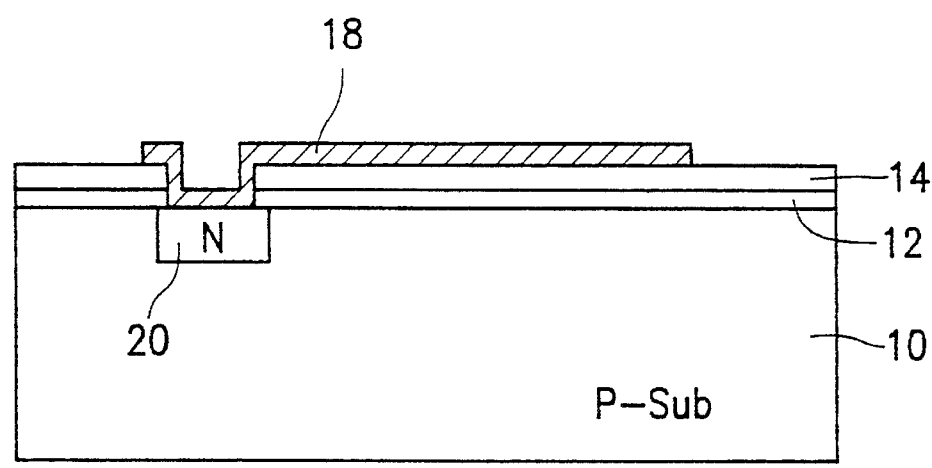

Referring to FIG. 1(b), a first layer of polysilicon 18 is then deposited, heavily doped with a dopant, for example phosphorus, and patterned by using conventional lithography and etching techniques to form a shield layer for the rotor of the micro electro-static motor and an upper electrode of the rotational speed detection devices which will be formed and described later. The polysilicon layer 18, in this embodiment, preferably has a thickness of about 400 nanometers. The polysilicon layer 18 generally needs to be annealed at a higher temperature as in the art. In this thermal processing and other thermal processing which may occur later, parts of the phosphorus impurities in the polysilicon layer 18 will diffuse automatically into the silicon substrate 10 to form N-regions or P-N junctions 20 acting as the above-mentioned rotational speed detection devices. The operation of the rotational speed detection devices will be further described in detail later.

Figure 1C:
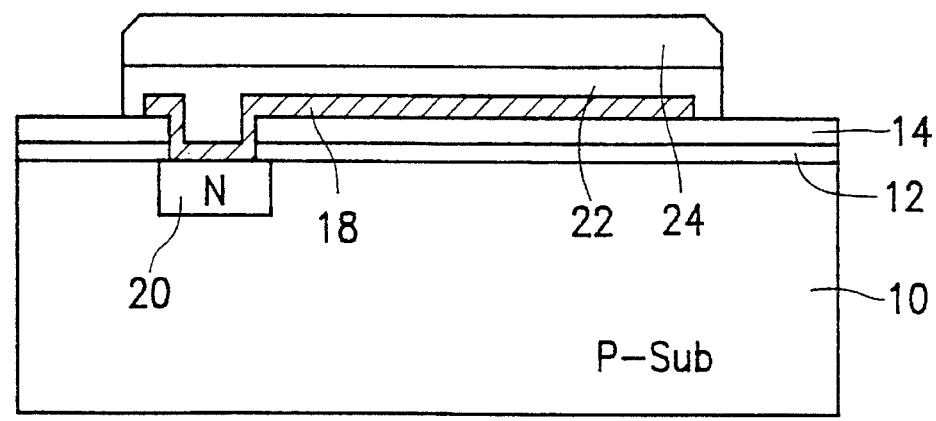

Referring to FIG. 1(c), a layer of phosphosilicate glass (PSG) 22 and a layer of silicon oxide ($Si_xO_y$) 24 are then deposited in sequence, and patterned by using conventional lithography and etching techniques to form an $Si_xO_y$/PSG composite sacrificial layer. In this embodiment, the phosphosilicate glass layer 22 preferably has a thickness of about 1.0 micrometer, and the silicon oxide layer 24, about 1.3 micrometers.

Figure 1D:
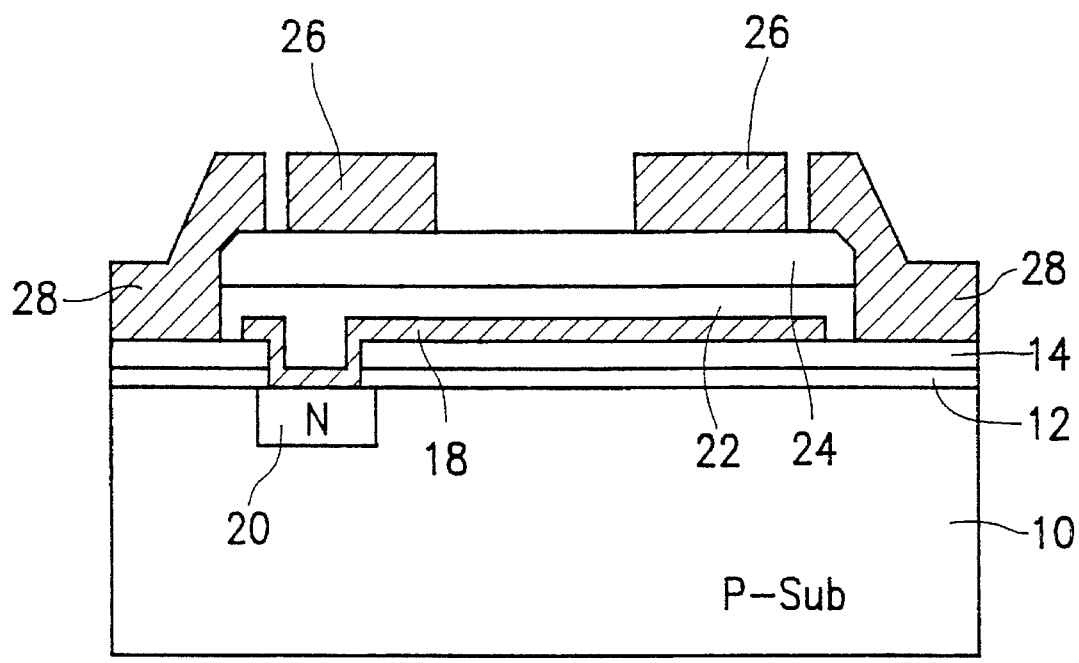

Referring to FIG. 1(d), after the rotor anchors are patterned in the PSG/$Si_xO_y$ layers 22 and 24, a second layer of polysilicon is deposited, heavily doped with a dopant, for example phosphorus, and patterned by using conventional lithography and etching techniques to form both the rotor 26 and the stator 28 of the micromotor. In this embodiment, the second layer of polysilicon preferably has a thickness of about 2.0 micrometers. The micromotor is preferably 120 micrometers in diameter, and the minimum gap between the rotor 26 and the stator 28 is 2.0 micrometers.

Figure 1E:
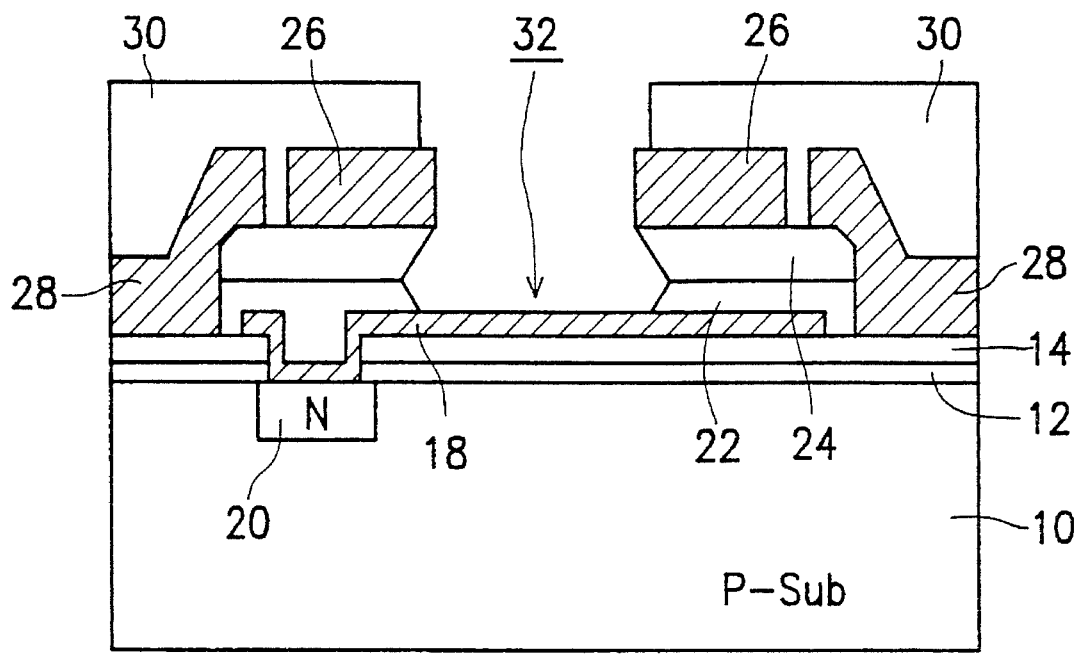
Figure 1F:
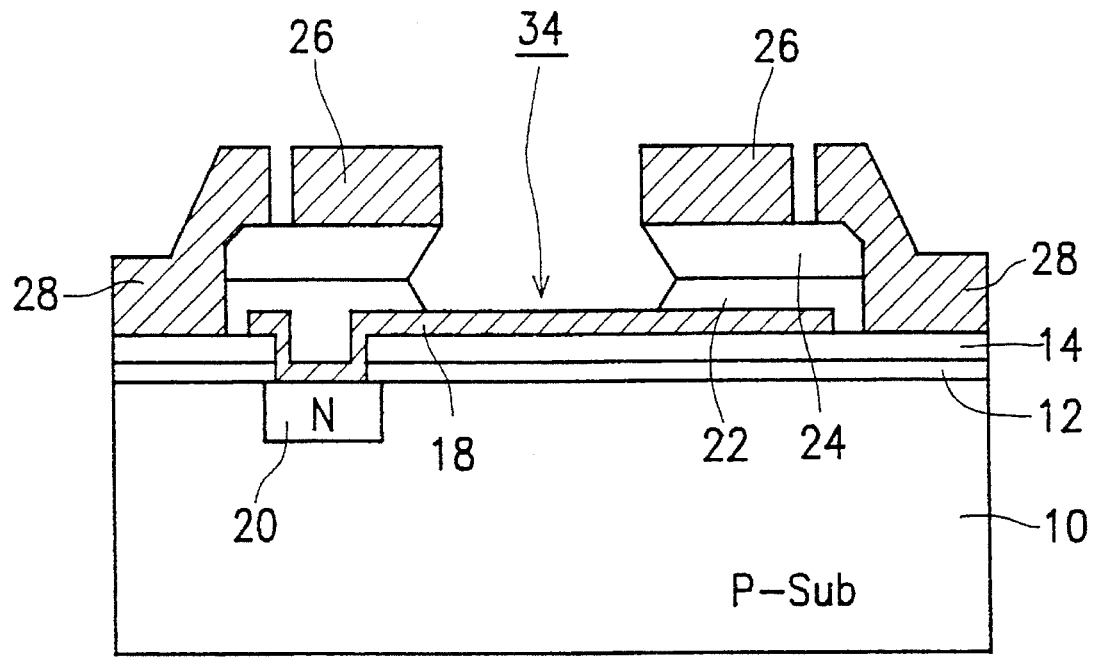

Referring to FIG. 1(e), another resist mask 30 is formed, and leaves uncovered the planned bearing or hub region. The exposed PSG/$Si_xO_y$ layers 22 and 24 are then removed by a RIE (reactive ion etching) overetching process to form a cone-like cavity 32. By the use of the large difference of etch rates between the silicon oxide and the phosphosilicate glass in buffered HF (hydrofluoric acid), about 1:10, a curved bearing mold or opening 34 as shown in FIG. 1(f) can be formed in a time-limited buffered HF etching of the phosphosilicate glass 22 and the silicon oxide 24. Then, the mask 30 is removed.

Figure 1G:
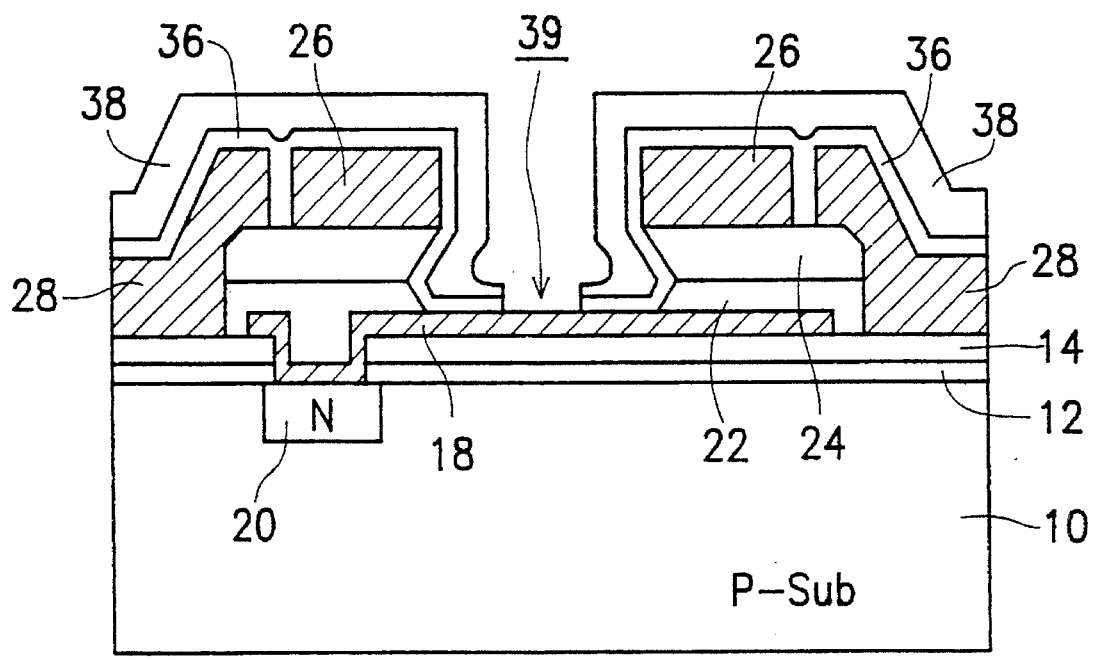

Referring to FIG. 1(g), a layer of silicon oxide 36 is deposited over the exposed surface. In this embodiment, the silicon oxide layer 36 preferably has a thickness of between about 500 to 800 nanometers. A resist mask 38 is formed over the silicon oxide layer 36, and leaves uncovered the planned bearing anchor region. The exposed silicon oxide 36 is removed by using conventional etching technique to form a bearing anchor opening 39, as shown in FIG. 1(g), and then the mask 38 is stripped.

Figure 1H:
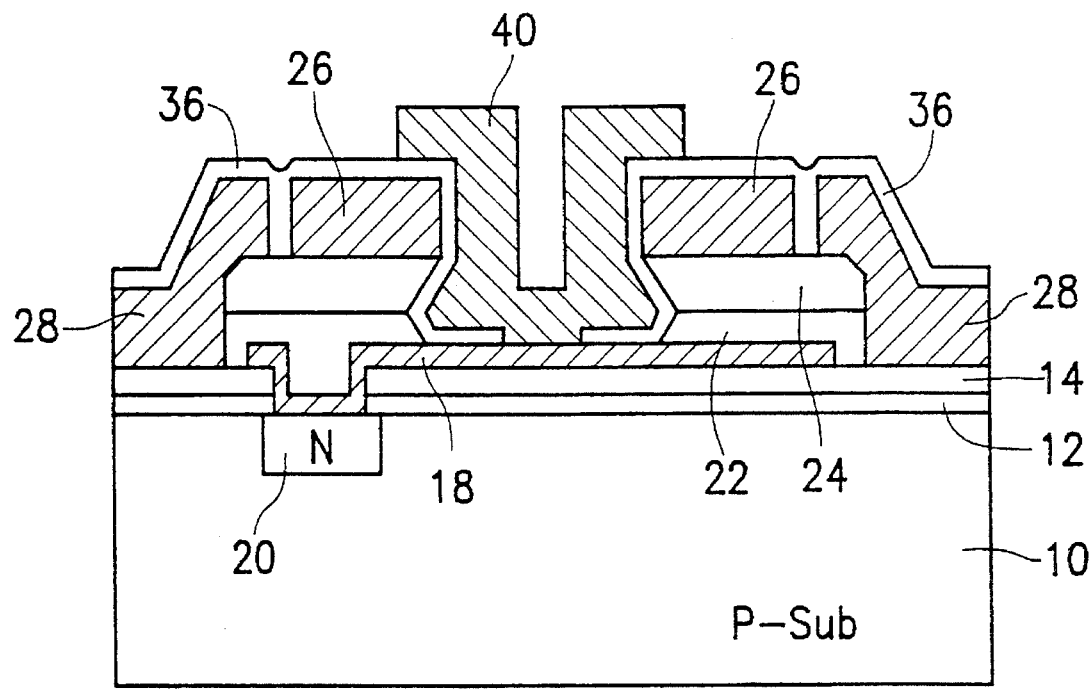
Figure 1I:
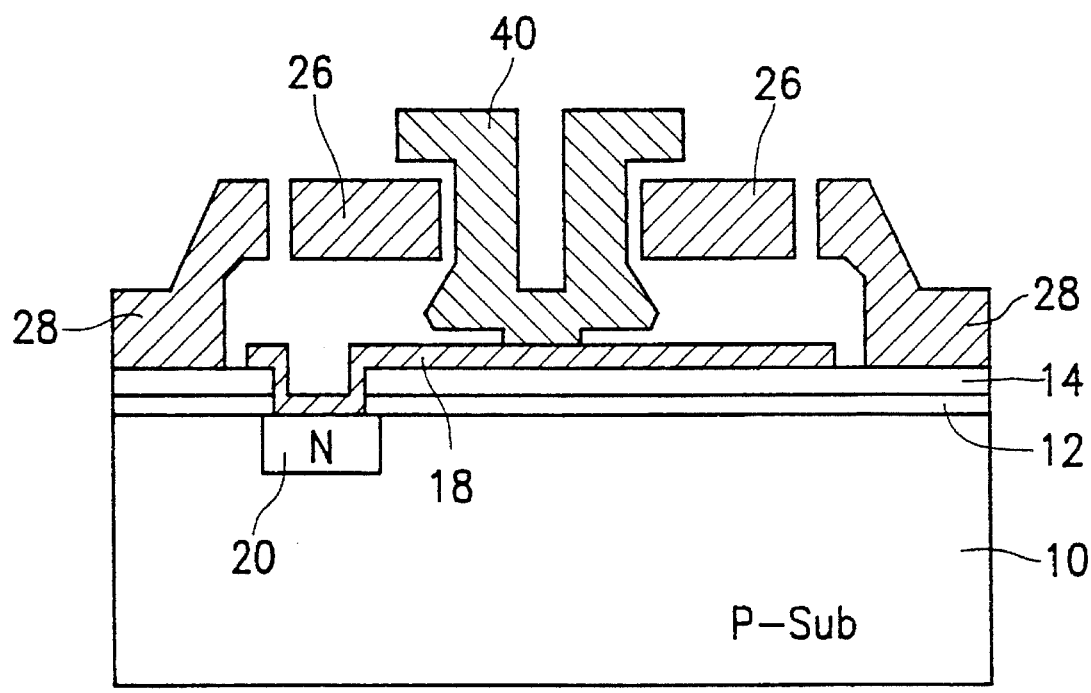

Referring to FIG. 1(h), a third layer of polysilicon is deposited, heavily doped with a dopant, for example phosphorus, and patterned by using conventional lithography and etching techniques to form a curved bearing 40. In this embodiment, the third layer of polysilicon preferably has a thickness of about 2.0 micrometers. Then, the polysilicon rotor 26 is released by dissolving the silicon oxides 24 and 36 and the phosphosilicate glass 22 in buffered HF, as shown in FIG. 1(i). After the micro electro-static motor structure is finished, the appropriate metallurgy is provided by conventional deposition, lithography, and etching steps that are well understood by those skilled in the art.

As shown in FIG. 1(i), the rotor 26 is held off the shield layer 18 by the curved bearing 40 which leads to a line contact of the rotor bottom with the bearing 40 instead of a plane contact as in the prior art. Therefore, the curved bearing structure of the present invention can greatly reduce the frictional torque during micromotor motion.

Figure 2:
FIG. 2 is a top plan view of an IC-processed micro electro-static motor according to the present invention, which is connected to three-phase driving signals for testing its motion.
Figure 2:
Figure 2:
Figure 2:
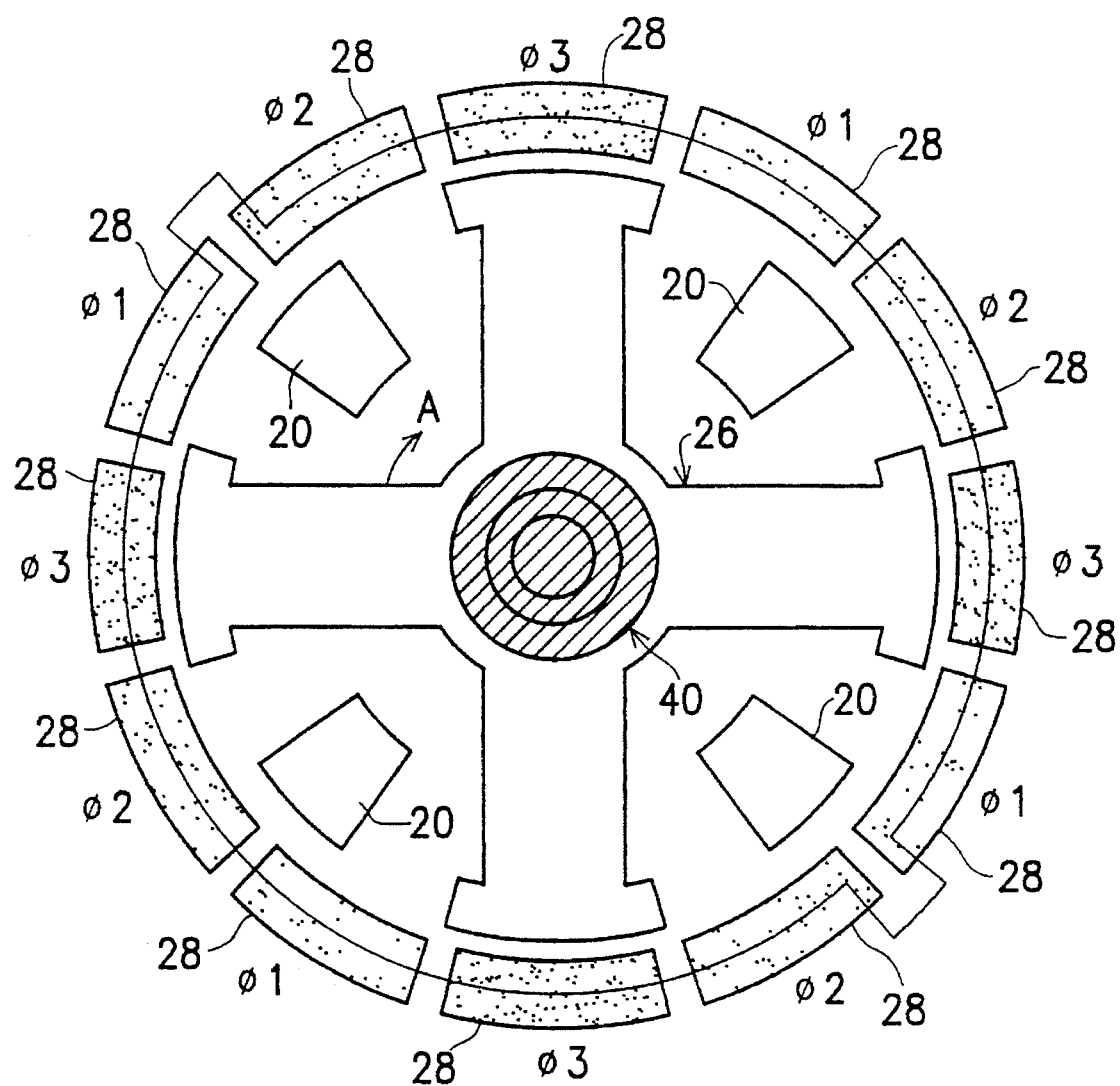

With reference to FIG. 2, there is shown a top plan view of an IC-processed micro electro-static motor manufactured by the method of the present invention. The micromotor of FIG. 2 includes a 12-pole stator 28, a 4-pole rotor 26, and four on-chip P-N junctions or rotational speed detection devices 20 having the same symmetry as the four rotor poles. The rotor 26 is rotatably supported by the bearing 40. A bias arrangement which supplies three-phase signals $\phi 1$, $\phi 2$ and $\phi 3$ to the micromotor, as shown in FIGS. 2 and 3, can be used to test the motion of the micromotor. This three-phase excitation condition causes a clockwise continuous rotation indicated by the arrow A as shown in FIG. 2. According to the present invention, the photovoltaic effect of the on-chip P-N junctions 20 can be utilized to simply and easily detect the micromotor rotational speed. More specifically, an appropriate constant parallel beam of light can be used to vertically shine the micromotor. As the micromotor is rotating around under the three-phase excitation, a series of periodic waveforms corresponding to the interruption of the light beam by the rotating rotor poles can be obtained at the output terminal of the P-N junctions 20. By counting these waveforms, the actual rotational speed of the micromotor can be easily obtained, and thus a closed-loop control of the rotational speed can be realized.

While the invention has been described in terms of what is presently considered to be the most practical and preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A method for manufacturing a micro electro-static motor comprising the steps of:

(a) providing a silicon substrate having a first conductivity type;

(b) forming an isolation layer over said silicon substrate;

(c) forming a shield layer on a surface region of said isolation layer;

(d) depositing in sequence a layer of phosphosilicate glass and a layer of silicon oxide over said shield layer and an exposed surface of said isolation layer;

(e) patterning said layers of phosphosilicate glass and silicon oxide by lithography and etching to form a phosphosilicate glass/silicon oxide composite sacrificial layer;

(f) depositing a first structural layer over said phosphosilicate glass/silicon oxide composite sacrificial layer and the exposed surface of said isolation layer;

(g) patterning said first structure layer by lithography and etching to form a rotor and a stator of said micro electro-static motor, the rotor having a bearing contact surface overlying the substrate;

(h) forming a first block-out mask over said rotor and stator, the first block-out mask exposing a portion of the phosphosilicate glass/silicon oxide composite sacrificial layer to form a bearing region;

(i) etching the bearing region of the phosphosilicate glass/silicon oxide composite sacrificial layer to form a curved bearing opening;

(j) removing said first block-out mask;

(k) depositing a second sacrificial layer over all of the exposed surface with a bearing anchor opening therethrough to expose a portion of said shield layer;

(l) depositing a second structure layer and defining it to form a curved bearing residing in said bearing anchor opening and said curved bearing opening, said curved bearing having a rotor contact surface extending between the rotor and the substrate, the rotor contact surface being transverse to the bearing contact surface; and (m) removing all of said phosphosilicate glass/silicate oxide composite sacrificial layer and said second sacrificial layer by etching to release said rotor, so that said rotor is rotatably supported by said rotor contact surface of said curved bearing.

2. The method of claim 1, wherein the step (c) includes the steps of patterning said isolation layer by lithography and etching to expose at least one silicon substrate surface for the formation of a rotational speed detection device, forming a first layer of polysilicon acting as said shield layer on said surface region of said isolation layer and said exposed substrate surface, heavily doping said first polysilicon layer with a dopant of a second conductivity type opposite to said first conductivity type, so that parts of said dopant in said first polysilicon layer diffuse into said silicon substrate to form a P-N junction acting as the rotational speed detection device.

3. The method of claim 2, wherein said isolation layer is composed of a film of thermally grown silicon dioxide and a overlay layer of silicon-rich nitride.

4. The method of claim 1, wherein the step (i) includes the steps of reactive ion etching of the exposed phosphosilicate glass/silicon oxide composite sacrificial layer to form a cone-like cavity, and time-limited buffered HF etching of said phosphosilicate glass/silicon oxide composite sacrificial layer to form said curved bearing opening.

5. The method of claim 4, wherein said first and second structure layers are second and third layers of polysilicon.

6. The method of claim 5, wherein said second sacrificial layer is a layer of silicon oxide.

7. The method of claim 6, wherein the step (m) includes the step of dissolving all of said second sacrificial layer and said phosphosilicate glass/silicon oxide composite sacrificial layer in buffered HF.

8. The method of claim 2, wherein the step (i) includes the steps of reactive ion etching of the exposed phosphosilicate glass/silicon oxide composite sacrificial layer to form a cone-like cavity, and time-limited buffered HF etching of said phosphosilicate glass/silicon oxide composite sacrificial layer to form said curved bearing opening.

9. The method of claim 8, wherein said first and second structure layers are second and third layers of polysilicon.

10. The method of claim 9, wherein said second sacrificial layer is a layer of silicon oxide.

11. The method of claim 10, wherein the step (m) includes the step of dissolving all of said second sacrificial layer and said phosphosilicate glass/silicon oxide composite sacrificial layer in buffered HF.

12. A method for manufacturing a micro electro-static motor comprising the steps of:

(a) providing a silicon substrate;

(b) depositing in sequence a layer of phosphosilicate glass and a layer of silicon oxide over a portion of said silicon substrate;

(c) patterning said layers of phosphosilicate glass and silicon oxide by lithography and etching to form a phosphosilicate glass/silicon oxide composite sacrificial layer;

(d) depositing a first structural layer over said phosphosilicate glass/silicon oxide composite sacrificial layer;

(e) patterning said first structure layer by lithography and etching to form a rotor and a stator of said micro electro-static motor, the rotor having an inner opening and a lower surface overlying the phosphosilicate glass/silicon oxide composite sacrificial layer;

(f) forming a first block-out mask over said rotor and stator, the first block-out mask exposing a portion of the phosphosilicate glass/silicon oxide composite sacrificial layer to form a bearing region;

(g) etching the bearing region of the phosphosilicate glass/silicon oxide composite sacrificial layer to form a bearing opening within the inner opening of the rotor;

(h) removing said first block-out mask;

(i) depositing a second sacrificial layer over all of the exposed surface;

(j) depositing a second structure layer and defining it to form a bearing residing in said bearing opening, said bearing having a rotor contact portion between the rotor and the substrate, said rotor contact portion having an upper surface transverse to the lower surface of the rotor to form a contact line between said bearing and the rotor; and (k) removing all of said phosphosilicate glass/silicate oxide composite sacrificial layer and said second sacrificial layer by etching to release said rotor, so that said rotor is rotatably supported by said bearing along said contact line.

13. A method for manufacturing a micro electro-static motor comprising the steps of:

(a) providing a silicon substrate having a first conductivity type;

(b) forming an isolation layer over said silicon substrate;

(c) forming a shield layer on a surface region of said isolation layer;

(d) patterning said isolation layer by lithography and etching to expose at least one silicon substrate surface for the formation of a rotational speed detection device (e) depositing in sequence a layer of phosphosilicate glass and a layer of silicon oxide over said shield layer and an exposed surface of said isolation layer;

(f) forming a first layer of polysilicon acting as said shield layer on said surface region of said isolation layer and said exposed substrate surface, heavily doping said first polysilicon layer with a dopant of a second conductivity type opposite to said first conductivity type, so that parts of said dopant in said first polysilicon layer diffuse into said silicon substrate to form a P-N junction acting as the rotational speed detection device (g) patterning said layers of phosphosilicate glass and silicon oxide by lithography and etching to form a phosphosilicate glass/silicon oxide composite sacrificial layer;

(h) depositing a first structural layer over said phosphosilicate glass/silicon oxide composite sacrificial layer and the exposed surface of said isolation layer;

(i) patterning said first structure layer by lithography and etching to form a rotor and a stator of said micro electro-static motor;

(j) forming a first block-out mask over said rotor and a bearing region;

(k) etching the bearing region of the phosphosilicate glass/silicon oxide composite sacrificial layer to form a bearing opening;

(l) removing said first block-out mask;

(m) depositing a second sacrificial layer over all of the exposed surface with a bearing anchor opening therethrough to expose a portion of said shield layer;

(n) depositing a second structure layer and defining it to form a bearing residing in said bearing anchor opening and said bearing opening; and (o) removing all of said phosphosilicate glass/silicate oxide composite sacrificial layer and said second sacrificial layer by etching to release said rotor, so that said rotor is rotatably supported by said bearing.

* * * * *